United States Patent Office 3,474,072
Patented Oct. 21, 1969

3,474,072
POLYCARBONATE-CARBAMATES
William E. Bissinger, Akron, Franklin Strain, Barberton, and Henry C. Stevens and William R. Dial, Akron, Ohio, and Raymond S. Chisholm, Pittsburgh, Pa., assignors to PPG Industries, Inc., Pittsburgh, Pa., a corporation of Pennsylvania
No Drawing. Continuation-in-part of application Ser. No. 488,286, Sept. 17, 1965. This application Apr. 5, 1967, Ser. No. 628,538
Int. Cl. C08g 20/34, 20/30
U.S. Cl. 260—49                             3 Claims

ABSTRACT OF THE DISCLOSURE

A wide variety of polycarbonate-carbamates of alkylidene bis phenols and diamines are described including diamines containing pairs of phenyl groups. Many of these polycarbonate resins can be cross-linked by reacting with diisocyanate and diisothiocyanates. Such polycarbonate-carbamates are prepared by reaction in the presence of hydrogen halide acceptor of phosgene and bis phenol followed by reaction of a resulting carbonate-chloroformate with diamine. Polycarbonate-carbamates of diamino diphenyl sulfones, especially N,N'-dialkyl diamino diphenyl sulfones possess superior solvent stress crack resistance.

RELATED APPLICATIONS

This application is a continuation-in-part of application Ser. No. 488,286, filed Sept. 17, 1965 now U.S. Letters Patent 3,320,211 granted May 16, 1967, which application is a continuation of Ser. No. 185,796, filed Apr. 9, 1962, now U.S. Letters Patent 3,215,668, granted Nov. 2, 1965; Ser. No. 113,628, filed May 31, 1961, now abandoned; and Ser. No. 698,055, filed Nov. 22, 1957, now abandoned.

This invention relates to novel types of synthetic resins and to the preparation of these materials. According to this invention, synthetic resins of unusual toughness and high molecular weight have been obtained. A large portion of the resins herein contemplated are thermosetting in addition to having the high toughness and molecular weight characterizing all of these resins. Such thermosetting resins have little or no solubility in organic solvents and resist melting or remain substantially unmelted when heated to temperatures above 100° C., for example, 110° C. to 200° C. Other resins contemplated herein are thermoplastic and can be formed under heat and/or pressure. Such resins also are characterized by their toughness, good electrical properties, and other advantageous properties.

SUMMARY OF THE INVENTION

According to this invention, novel resinous polycarbonate esters of an alkylidene bis phenol which contain carbamate or amide groups have been produced. Such of these resins contain the general structure:

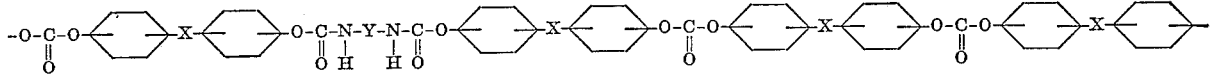

where X is the link or linking radical between a pair of phenyl radicals, Y is the link or linking radical between the nitrogens, such as the radical of a diamine. Thus, it will be seen that the polymer is a mixed polymeric ester of (A) bis phenol and (B) carbonic acid, and the theoretical bis carbamic acid having the structure:

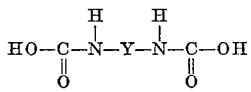

Y being the linking radical between the carbamic acid groups.

The ratio of the carbamate groups

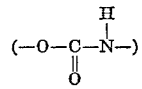

to the carbonic groups

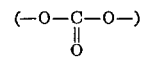

should be such that the carbonic groups are substantially in excess. Normally, the number of carbonic groups are at least about twice the number of carbamate groups and may be as high as 20 or even 50 times the number of carbamate groups.

The carbamate-carbonate esters of the alkylidene bis phenol may be prepared in various ways. For example, a bis chloroformate of a bis phenol may be reacted with a diamine and a dihydroxy compound which contains two hydroxy groups capable of reacting with chloroformate to form carbonate esters. In this case, about 2 to 20 or even as high as 50 equivalents of the dihydroxy compound are used per equivalent of diamine.

The type of resin obtained depends upon the manner by which the reaction is conducted. Since the amine normally is more reactive than the hydroxy compound (bis phenol or glycol), the amine normally reacts to a greater degree than the hydroxy compound when the bis phenol chloroformate is added to a mixture of the two. In such a case, the resin obtained is in essence two resinous esters (block polymers) linked together, the one being a polymeric ester of the bis phenol and the theoretical carbamic acid mentioned above, the other being the polycarbonate of the bis phenol and the hydroxy compound. Such a resin consists essentially of blocks or chains of the two types of polymeric esters. A similar type of material is obtained when the diamine is mixed first with prepolymer chloroformate of the bis phenol, and the dihydroxy compound added later.

A more regular alternation of carbonate and carbamate groups in the chain can be achieved by separately adding the diamine and the bis chloroformate compound to a pool of the dihydroxy compound containing the hydrogen chloride acceptor, each being added at a relatively slow and controlled rate. Thus, the amine and the bis chloroformate may be added to a pool of the dihydroxy compound at relative rates proportional to the total moles of chloroformate, dihydroxy compound, and amine to be used. For example, if one mole of diamine and one mole of dihydroxy compound are to be reacted with 2.2 moles of the bis phenol bis chloroformate, a pool of the dihydroxy compound and an excess of hydrogen halide acceptor, for example, 5.5 moles of aqueous sodium hydroxide, sodium carbonate or bicarbonate, is established. Thereafter, the one mole of diamine and 2.2 moles of bis chloroformate are added gradually and simultaneously at a rate such that, during any period during the addition, 2.2 moles of bis chloroformate are being added per mole of diamine.

If desired, the proportionate rate of addition of the bis chloroformate may be faster than the rate of adding the amine, i.e. the proportionate rate per minute of addition of chloroformate and amine on a mole basis is not substantially less than the molecular proportion of the total chloroformate to total amine to be added.

The following are typical examples:

Example I

The bis chloroformate of bis phenol A (a condensation product of acetone and phenol, otherwise known as p,p'-isopropylidene diphenol—see Merck Index, 6th Edition) is prepared as follows:

Two hundred grams of phosgene is dissolved in 2000 cubic centimeters of toluene at 5° C. Then, 228 grams of bis phenol A in 1000 cubic centimeters of dioxane is added, followed by the addition of a solution of 242 grams of dimethyl aniline in 240 cubic centimeters of dioxane. During the addition of the dimethyl aniline solution, the temperature rises to 47° C. Then heat is finally applied to raise the temperature to 85° C. for three hours. The mixture is allowed to stand overnight.

Two liquid phases are thus produced. The lower dimethyl aniline hydrochloride phase solidifies and is filtered off. The filtrate is topped at reduced pressure at 50° C., first at 85 millimeters and then at one millimeter absolute pressure, until no more solvent is collected. The solid bis chloroformate of bis phenol A is thus produced. This material is purified by recrystallization from methylene chloride.

A sodium phenate solution is prepared by mixing one mole of bis phenol A with 500 grams of sodium hydroxide as an aqueous solution of sodium hydroxide containing 10 percent by weight of NaOH and 600 milliliters of methylene chloride at a temperature of 25° C. to 30° C. One mole of p,p'-diaminodiphenylmethane and 600 milliliters of methylene chloride is added to this solution.

Thereupon, 3.5 moles of bis phenol A bis chloroformate in 1500 milliliters of methylene chloride is added to the mixture while maintaining the temperature at about 25° C. to 30° C. The resultant viscous, white reaction mixture is stirred for an additional hour after addition of the chloroformate has been completed, and the mixture is allowed to stand for 14 hours. The reaction mixture is diluted with 5000 milliliters of methylene chloride and washed thoroughly with six 5000-milliliter portions of water in a separating funnel. The mixture is then washed with an aqueous solution which contains 3 percent by weight of pyridine and 2 percent by weight of NaOH. Thereafter it is washed to neutrality with a dilute aqueous hydrochloric acid solution and thereafter washed with water. The solvent is evaporated and a viscous, resinous, solid polymer is obtained.

Example II

The process of Example I is performed using the same materials except that the procedure of adding the reactants is different. In this example, separate streams of the bis phenol A chloroformate and of the p,p'-diaminodiphenylmethane are added gradually to the methylene chloride solution containing the sodium phenate of the bis phenol (the reaction product of the bis phenol and the sodium hydroxide). The rates of addition of the chloroformate solution and the amine solution are so proportioned that the entire amounts of each material are added during the same period of time. That is, the number of millimoles of chloroformate introduced into the solution per minute is approximately 3.5 times the number of millimoles of amine introduced per minute therein.

Example III

The process of Example II is performed using one mole of hexamethylene diamine in lieu of p,p'-diaminodiphenylmethane.

Example IV

The process of Example II is followed except that 1.8 moles of bis phenol A and 0.2 mole of the p,p'-diaminodiphenylmethane is used in lieu of the amount set forth in Example I.

The above processes produce tough resins which can be molded at temperatures in the range of 150° C. to 200° C. under pressure.

When 0.1 to 1 mole (for example, 0.5 mole) of 4,4'-diisocyanate-3,3'-dimethyl biphenyl (commericially known as "TODI") or like diisocyanate is intimately mixed with any of these resins and the mixture molded at 200° C. and held at 200° C. for 30 minutes, clear tough insoluble essentially infusible polymers are produced.

The above are typical examples of the manner in which the resins herein contemplated may be prepared. Various alkylidene bis phenols can be used in equivalent amount in lieu of bis phenol A in the above examples. These include:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane Moreover, the corresponding bis chloroformates of these bis phenols may be used in equivalent amount in lieu of bis phenol A bis chloroformate.

In addition, various other diamines can be used in lieu of the amines of the above examples, also in equivalent amount. Of particular interest are the amines which contain the group

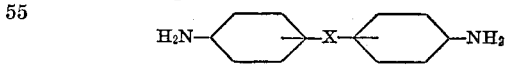

where X is a radical, such as: —O—, —S—, the group

or a hydrocarbon radical or substituted divalent hydrocarbon radical which rarely contains more than 8 carbon atoms linking the two aniline groups

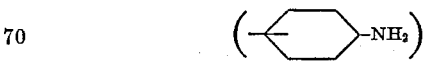

together. Some of these materials are prepared, as is understood by the art, by condensing aniline with an aldehyde, such as formaldehyde, acrolein, butyraldehyde, and like aldehydes containing up to about 8 carbon atoms, or a ketone such as acetone, methyl ethyl ketone, or like ketones containing up to about 8 carbon atoms. Some of these compounds are in monomeric form, others are in more complex polymeric form but contain two or more imino or amino groups.

Where X is a

radical, the compounds are diaminodiphenyl sulfones, the simplest member of which is p,p'-diaminodiphenyl sulfone. Other diaminodiphenyl sulfones include 3,3'-diaminodiphenyl sulfone, 4,4'-diamino-3,3'-dichlorodiphenyl sulfone, 3,4'-diamino-3,4'-dichlorodiphenyl sulfone and like diamino sulfones containing other substituents on the phenyl nuclei including 1 to 4 alkyl, alkoxy and alkenyl groups, most notable of which are the methyl and methoxy substituents. If the diphenyl sulfone contains a pair of imino groups, it is a secondary diamine. One such diphenyl sulfone containing a pair of secondary amino groups (imino groups) is N,N'-dimethyl-4,4'-diaminodiphenyl sulfone. Other N,N'-dialkyldiaminodiphenyl sulfones include (usually containing up to 4 carbons in the alkyl groups) N,N'-dimethyl-4,4'-diamino-3,3'-dichlorodiphenyl sulfone; N,N' - diethyldiaminodiphenyl sulfones, N,N'-diethyl-4,4'-diamino-3,3'-dichlorodiphenyl sulfone, N,N'-methylethyl-4,4'-diaminodiphenyl sulfone, N,N'-dimethyl-3,4'-diamino sulfone, N,N'-dimethyl-3,3'-diamino-4,4'-dichlorodiphenyl sulfone and the like, including other diaminodiphenyl sulfones having from 1 to 4 ring substituents on each phenyl nucleus. Among such substituents are the halogens, most notably chlorine, alkyl, alkoxy and alkenyl, usually of from 1 to 4 carbon atoms, exemplified by methyl and ethyl; methoxy, ethoxy and 2-chloroethoxy; allyl and vinyl groups.

Thus, when the diamine is such diaminodiphenyl sulfone, the novel resinous polycarbonate resins have the general structure conforming to the formula earlier set forth in this disclosure, the linking radical Y being the radical of the sulfone as follows:

carbonate or bicarbonate, or an amine, and usually in the presence of a halogenated hydrocarbon solvent, such as methylene dichloride. This results in the production of a polycarbonate of relatively low molecular weight having free chloroformate groups. Thereafter, a diamine, such as one of the diamines listed above, with or without more bis phenol, may be added and the mixture allowed to stand or is heated until further reaction has taken place. The amount of diamine thus added can be up to one mole (usually not over 0.5 mole) of the diamine per mole of chloroformate

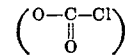

in the product.

The following is a typical example of the process herein contemplated:

Example V

Two thousand, one hundred milliliters of dionized water, 5.28 moles of sodium hydroxide, and 1.805 moles of bis phenol A are placed in a flask. To this mixture is added 1350 milliliters of methylene chloride. The mixture is held at a temperature of 25° C. and 2.2 moles of phosgene is introduced at a constant rate over a period of about 3.25 hours while maintaining the temperature at about 25° C. The chloroformate chlorine content of the resulting resin is about 2.5 percent and the product thus corresponds to an average molecular weight of approximately 2900. To a portion of the solution containing 100 grams of the resulting resin is added 0.02 mole of ethylene diamine.

The resulting reaction mixture is then allowed to stand at 25° C. with stirring for a period of about 5 hours, and is heated at reflux temperature for 3 hours. Thereafter, the organic phase is recovered, washed with water to remove entrained salts, and the resulting solution is heated to evaporate the solvent. The resulting product is a powder which can be molded at 200° C. and a pressure of 2000 pounds per squire inch to produce a tough polymer. Films cast from a methylene chloride solution of the polymer are colorless, clear, and strong.

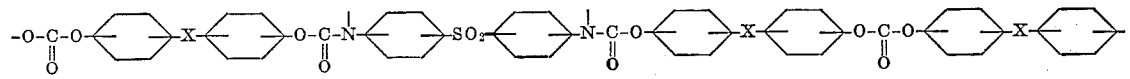

X being as before defined.

Other diamines which can be used in lieu of amines used in Examples I to IV include the aliphatic diamines, such as ethylene diamine, hexamethylene diamine, propylene diamine, trimethylene diamine, tetramethylene diamine, 4,4'-diaminodicyclohexyl methane, bis (ω-aminoalkyl) sulphides, 2,4-diaminotetrahydrofurane, 1,4-diaminocyclohexane, as well as the aromatic diamines, such as o-phenylene diamine, 4,4'-diaminodiphenyl ether, 4,4'-diaminobenzophenone, 1,7-naphthylene diamine, piperazine, m-phenylene diamine, o-tolidine, m-tolidine, and the like.

Various dihydroxy compounds can be used in lieu of a portion of the bis phenol A listed above. These include the various bis phenols mentioned above as well as the various other dihydric alcohols or hydroxy compounds containing esterifiable hydroxy groups, such as ethylene glycol, diethylene glycol, triethylene glycol, tetraethylene glycol, propylene glycol, 1,3-propane diol, 1,4-butane diol, phthallyl alcohol, 1-butene-3,4-diol, 1,4-butene diol, resorcinol, catechol, thiodiglycol, and the like.

According to a further method of producing a resin of the type contemplated above, an alkylidene bis phenol, such as bis phenol A, may be reacted in part with phosgene in the presence of a hydrogen chloride acceptor, such as an alkali metal or alkaline earth metal hydroxide, It is to be understood that the process set forth in Example V can be performed using various other amines in equivalent amounts in lieu of ethylene diamine. The amines and dihydroxy compounds which may be used are those listed above.

Thus, diaminodiphenyl sulfones can be used in lieu of ethylene diamine to obtain valuable high molecular weight products as illustrated in these following examples:

Example VI

A five-liter, three-necked flask fitted with a stirrer was charged with 538.6 grams of aqueous sodium hydroxide (50 weight percent NaOH), 1700 milliliters of distilled water, 0.40 gram of sodium dithionite, 6.849 grams of phenol and 456.6 grams (2 mols) of bis phenol A. After stirring at 25° C. for 6 hours, 1200 milliliters of methylene chloride were added, following which 286 grams of phosgene were introduced over a 58 minute period at a uniform rate while the flask contents were gently stirred (250 r.p.m.) and kept at 250 C. This produced a low molecular weight polymer in the organic phase containing about 10.6 weight percent chloroformate chlorine (equivalent of 0.795 mole of polymeric bis chloroformate).

After doubling the stirring rate, a slurry containing 165.2 grams of 4,4'-diaminodiphenyl sulfone in 250 milliliters of methylene chloride was added, followed by 69.3 grams of aqueous sodium hydroxide (50 percent NaOH). Some 3.5 hours later, 0.831 gram of triethylamine in 100 milliliters of water was added and somewhat later 20 grams more of aqueous sodium hydroxide (50 weight percent).

Thereafter, the reaction medium (which was in the form of a light emulsion) was diluted with several volumes of methylene chloride, water washed four time with distilled water, then twice with 3 percent hydrochloric acid, followed by one further distilled water wash and then dried over anhydrous sodium sulfate.

A brittle polycarbonate-carbamate polymer was isolated by evaporating this washed organic solution on a steam bath and drying which analyzed as containing by weight 2.12 percent sulfur and 1.62 percent nitrogen.

Example VII

A three-necked, one-liter, stirrer equipped flask was charged with 74.2 grams of aqueous sodium hydroxide (50 weight percent), 0.055 gram of sodium dithionite, 0.943 gram of phenol, 235 milliliters of distilled water and 62.8 grams of bis phenol A. After stirring at 25° C., 165 milliliters of methylene chloride were added and then 44.6 grams of phosgene were introduced in 49 minutes into the flask at a constant rate while the contents were stirred (250 r.p.m.) and at 25° C. The thus prepared low molecular weight chloroformate polymer contained 11.8 weight percent chloroformate chlorine.

A slurry of 20.7 grams of 4,4'-diaminodiphenyl sulfone in 100 milliliters of water was added quickly with the stirring rate double (500 r.p.m.). Then 13.4 grams of aqueous sodium hydroxide (50 percent NaOH) were added, stirring continued for 2 hours with the mixture still at 25° C. when 0.104 gram of triethylamine in 25 milliliters of water was added. Some 10 grams more of 50 percent NaOH were added, and an hour later, the reaction medium (which was in the form of a thin emulsion) was diluted with 2 liters of methylene chloride, washed twice with distilled water, twice with 3 percent hydrochloric acid, five times with water and then dried with sodium sulfate.

A brittle polycarbonate-carbamate polymer of the bis phenol and sulfone was isolated by evaporating solvent on a steam bath and drying at 60° C. It had an inherent viscosity of 0.30 deciliter per gram (0.5 gram measured in 100 milliliters of a 40:60 mixture of tetrachloroethane-phenol at 30° C.) and contained by weight 1.56 percent nitrogen and 2.52 percent sulfur.

Example VIII

The procedure of Example VII was followed except no phenol was charged.

Polymer isolated by evaporation evidenced toughness, contained by weight 1.65–1.70 percent nitrogen and 2.39–2.24 percent sulfur and had an inherent viscosity of 0.45 deciliter per gram.

Some of the polymer was also isolated by adding n-hexane to a stirred, concentrated methylene chloride solution and drying the separated precipitate. This dried polymer melted between 208° C. and 260° C. and was stable at 280° C. It was compression molded into bars at 7000 p.s.i. and at 210° C.

Example IX

Example VIII was duplicated except that the initial bis phenol A-sodium hydroxide containing mixture in the flask was stirred for 6 hours and stood overnight before phosgene addition. In addition, the total phosgene was 49.9 grams and 20 grams (rather than 10 grams) of 50 percent NaOH were added after the triethylamine. The low molecular weight prepolymer contained 10.6 weight percent chloroformate chlorine.

After the addition of the triethylamine, the reaction emulsified and became quite viscous. After standing and decanting the aqueous phase, the emulsion was removed from the flask and diluted with 1.5 liters of methylene chloride. After washing with water, 3 percent hydrochloric acid, dilute aqueous NaOH and drying, a polymer with good film forming qualities was recovered which was cast from methylene chloride solution into a 4 mil thick film. It contained by weight 1.07 percent nitrogen and 1.8 percent sulfur and had an inherent viscosity of 1.15 deciliters per gram.

Example X

A one-liter flask was charged as in Example VII. To the mixture, 51.2 grams of phosgene were added at a uniform rate over a 58 minute period. The resulting polymer contained 9.8 weight percent chloroformate chlorine.

A slurry of 23.0 grams of N,N'-dimethyl-4,4'-diaminodiphenyl sulfone in 100 milliliters of methylene chloride was added. This was followed by the addition of 13.4 grams of 50 percent NaOH, 2 hours of stirring at 500 r.p.m. and 25° C. Triethylamine (0.105 gram) in 25 milliliters of water was then added and an emulsion formed. A further 10 grams of 50 percent NaOH were added and the emulsion broke.

Thereafter, the aqueous layer was decanted and the organic layer diluted with 2 liters of methylene chloride. This organic layer was then water washed, dilute hydrochloric acid washed and dried with sodium sulfate.

Polymer was isolated by addition of n-hexane to the dried organic solution and drying of the precipitate. This polymer powder possessed a high melt flow, a bar of it softened at 240° C. and melted at about 320° C.

Polymer film isolated by evaporation from the organic solution on a steam bath and drying was quite tough, had an inherent viscosity of 1.03 deciliters per gram. It contained by weight 2.37–2.40 percent nitrogen and 2.18–2.36 percent sulfur.

Four compression molded 30 mil films were made from the powder at about 10,000 p.s.i. and at 243° C. (470° F.), 243° C., 254° C. and 271° C., respectively. This polymer was then tested for resistance to solvent stress cracking resistance according to the test procedure described in SPE Journal, June 1962, "Stress Cracking of Rigid Thermoplastics," by R. L. Bergen, Jr. The critical stress (p.s.i.) in $CCl_4$ was 2250 and 2430 and in gasoline 3800 and 3690, and even then the films did not break, but only crazed.

By comparison, a homopolymer polycarbonate of bis phenol A of substantially the same inherent viscosity (1.00 deciliter per gram) gave values of but 1300 p.s.i. in $CCl_4$ and 1860 in gasoline.

Example XI

Using the apparatus and procedure described in Example X but adding 0.880 gram of phenol, and then adding 42.9 grams of phosgene in 108 minutes, resulted in a prepolymer containing 8.2 weight percent chloroformate chlorine. To this low molecular weight prepolymer chloroformate, 6.91 grams of N,N'-dimethyl-4,4'-diaminodiphenyl sulfone in 50 milliliters of methylene chloride were added. Thereafter (200 minutes later), 0.105 gram of triethylamine in 25 milliliters of water was added, following which the reaction emulsion became more viscous. After 20 grams of 50 percent NaOH were added, the emulsion broke after first becoming even more viscous. After water washings and hydrochloric acid washings of the solution, a dried polymer was obtained by evaporation which had an inherent viscosity of 0.56 deciliter per gram, a nitrogen content of 0.92–0.98 weight percent and a sulfur content of 1.25–1.35 weight percent. It had a melt flow value of about 0.5 gram per 3 minutes at 300° C. with a 325 gram weight through a 0.012 inch diameter orifice.

Polymer was also recovered by adding n-hexane to the solution while stirring and drying the precipitate. Two compression molded 30 milliliter thick films of good clarity, flexibility and color were made therefrom at a temperature of about 243° C. (470° F.). The critical strength thereof (respecting resistance to solvent stress cracking) in gasoline was 2330 p.s.i. as measured by the test identified in Example X.

Example XII

Example XI was duplicated except that an equimolar quantity of 4,4'-diaminodiphenyl sulfone was used in lieu of the sulfone of Example XI. Obtained was a polycarbonate-carbamate product analyzing by weight as containing 0.91 to 0.95 percent nitrogen and 1.06 to 1.12 percent sulfur and having an inherent viscosity of 0.61 deciliter per gram which after heating at 460° F. was 0.58 deciliter per gram. From polymer powder obtained from the n-hexane precipitation compression molded clear flexible films were prepared. The critical strength thereof as determined by the test described in Example X was 725 p.s.i. for carbon tetrachloride and 2520 p.s.i. for gasoline (values considerably greater than those exhibited by polycarbonates of only bis phenol A or even of polycarbonate-carbamate copolyesters of bis phenol A and piperazine). A clear 2.5 mil film was cast from the powder which did not craze or crack after exposure to carbon tetrachloride overnight as a one inch loop in contrast to films having equivalent inherent viscosity of only bis phenol A polycarbonates or of polycarbonate-carbamates of bis phenol A and piperazine which break in this test.

As the test properties of the products of Examples X to XII indicated, the polycarbonate-carbamate of bis phenol A and a diaminodiphenyl sulfone evidenced superior resistance to stress cracking by comparison with homopolymer polycarbonates of bis phenol A. These diaminodiphenyl sulfone-bis phenol A polycarbonate resins also evidenced stress crack resistance properties superior to copolymers wherein the diamine is, for example, piperazine.

Polycarbonate-carbamates derived from diamino sulfones having a pair of imino groups (i.e. a pair of secondary amino groups) are especially heat stable and hence comprise a preferred class of resins. Thus, the polycarbonate-carbamate of a diphenol such as bis phenol A and an N,N'-dialkyldiaminodiphenyl sulfone possesses the desired combination of resistance to heat and solvent stress cracking.

Of course, mixtures of different amines may be used. Thus, polycarbonate-carbamate polyesters of one or more diphenols such as bisphenol A and both a diaminodiphenyl sulfone and other diamines such as methylene bis aniline, piperazine, hexamethylene diamine or the like may be prepared.

According to a further method, a mixture of the bis phenol, such as bis phenol A, with a diamine, such as methylene bis aniline or hexamethylene diamine, may be reacted with a bis chloroformate of another dihydric compound. Typical bis chloroformates suitable for this purpose include the bis chloroformates of the alkylene glycols, such as ethylene glycol bis chloroformate, diethylene glycol bis chloroformate, triethylene glycol bis chloroformate, tetraethylene glycol bis chloroformate, 1,4-butane diol bis chloroformate, resorcinol bis chloroformate, phthalyl alcohol bis chloroformate or the like. The reaction is usually conducted in the presence of an acid acceptor, such as an alkali metal hydroxide or carbonate.

Here, again, the type of resin produced depends upon the order of addition of the reactants, a block type of polymer of the type discussed above being obtained when the amine is first reacted with the chloroformate as in Example I, and a more regular alternation of carbamate and carbonate groups being obtained when the bis chloroformate and the amine are added to the pool of the sodium phenate as in Example II.

The following are typical examples:

Example XIII

A mixture of 1 mole of bis phenol A, 1 mole of methylene bis aniline hydrochloride, 2.2 moles of diethylene glycol bis chloroformate, and 3000 grams of methylene dichloride is placed in a flask and 7.5 moles of sodium hydroxide as an aqueous solution containing 50 percent by weight of NaOH is added while holding the mixture at 5° C. The product is allowed to stand at 25° C. for 4 hours and is recovered by washing with water and evaporating the solvent. The resulting product is a resinous material which, on molding at 175° C. under a pressure of 2000 pounds per square inch, forms a tough molding. When heated with 5 percent by weight of toluene-2,4-diisocyanate under pressure of 1000 pounds per square inch at a temperature of 200° C., an infusible polymer is obtained.

Example XIV

The process of Example XIII is performed using 1 mole of hexamethylene diamine in lieu of methylene bis aniline.

Example XV

One mole of bis phenol A is mixed with 5.5 moles of an aqueous solution of sodium hydroxide (containing 10 percent by weight of NaOH) and 600 milliliters of methylene chloride. The mixture is held at a temperature of 25° C. to 30° C. while 2.2 moles of diethylene glycol bis chloroformate and 1 mole of p,p'-diaminodiphenylmethane dissolved in 600 milliliters of methylene chloride are separately added thereto simultaneously over the same period of time. The mixture is recovered as in Example I.

A tough resin is obtained which cures to an infusible state when mixed with 1,5-naphthalene diisocyanate, the mixture molded and heated at 200° C. for 3 hours at pressure of 200 pounds per square inch.

Any of the other amines listed above may be used in equivalent amount in lieu of those mentioned in Examples XIII and XV. Bis phenol A may be replaced in equivalent amount by other bis phenols listed above and other bis chloroformates, such as ethylene bis chloroformate, 1,4-butane diol bis chloroformate, etc., including those listed above, may replace equivalent amounts of diethylene glycol bis chloroformate in the Example XIII to XV.

As shown above, the various carbonate polymers which contain carbamate groups such as described above are fusible and soluble in organic solvents. This is an advantageous property during the period during which the resin is under preparation and/or processing for use.

These polymers can be converted to a state where they are essentially insoluble in inorganic solvents and where they are essentially infusible, or at least do not readily fuse at temperatures below their decomposition temperature, by mixing the polymer described above with an organic diisocyanate. Typical diisocyanates which may be used for this purpose include 1,5-naphthalene diisocyanate, tolylene diisocyanate, ethylene diisocyanate, trimethylene diisocyanate, tetramethylene diisocyanate, hexamethylene diisocyanate, decamethylene diisocyanate, heptylidene diisocyanate, and the corresponding diisothiocyanates; cycloalkylene diisocyanates and diisothiocyanates, e.g. cyclopentylene diisocyanate, cyclohexylene diisocyanate; aromatic diisocyanates and diisothiocyanates, e.g. m-phenylene diisocyanate, naphthalene diisocyanate, and diphenyl-4,4'-diisocyanate; aliphatic-aromatic diisocyanates and diisothiocyanates, e.g. xylene-1,4-diisocyanate, 4,4'-diphenylene-methane diisocyanate, and cyclopentyl diisocyanate; and diisocyanates and diisothiocyanates containing hetero-atoms.

The preferred diisocyanates and diisothiocyanates are of the type OCN—R—NCO and SCN—R—NCS, wherein R represents saturated divalent hydrocarbon radicals with a chain length of at least two (rarely more than 12) carbon atoms.

The amount of the isocyanate so added normally ranges between about 0.1 to 1 mole of isocyanate groups per mole of reactive hydrogen such as present in carbamate and hydroxyl groups of the polycarbonate polymer subjected to treatment. The isocyanate may be incorporated by grinding or otherwise pulverizing the polymer and incorporating the isocyanate. Alternatively, the isocyanate may be added to the organic solution prior to evaporation of the solution. In such a case, however, the evaporation of solvent should be conducted at a relatively low temperature, for example, 50° C. or lower.

At all events, the desired cured polymer is prepared by heating the polycarbonate-carbamate mixture with the diisocyanate at an elevated temperature, usually above 750° C. and rarely above 300° C. The resulting products retain to a large degree the inherent toughness of the polycarbonate subjected to treatment and at the same time exhibit little tendency to fuse upon heating. They are either inert to organic solvents or are only swelled by such solvents.

The various resins which have been described above can be used for many purposes. For example, they may be used to provide laminated articles. Thus, the resins herein contemplated can be used to impregnate woven or felted fiber glass, linen or cotton cloth or the like, and the impregnated fabric may be built into a laminate which may then be heated at the fusion temperature of the resin to bond the layers together. These laminates can be used as structural material for roofing, siding and other construction materials for buildings, boats, etc.

Where diisocyanate is included in the nitrogenous-containing polymers described above, the resulting laminate is quite rigid and shows little tendency to distort at temperatures of 125° C. to 150° C.

The various resins herein contemplated may be applied to metal as a coating which may be either in the form of solutions or in the form of a powder which is melted or fused onto the metal surface. Many of the products herein contemplated can be used to impregnate woven or felted fiber glass, linen or cotton cloth or th like, and the impregnated fabric may be built up into a laminate which they can be molded to enclose and protect electrical conductors, connections, switches and the like. Since the products are clear and tough, they may be used for transparent windows. They may also be drawn into fibers for use in fabrics. Substantially, all of these materials form very tough, impermeable films.

Hence, they may be used to produce films suitable for use in wrapping food and other articles and for other purposes where films of polyethylene and regenerated cellulose are used.

We claim:
1. A mixed carbonate-carbamate polyester of (A) a p,p'-isopropylidene bis phenol, (B) carbonic acid and (C) a N,N'-dialkyl diamino diphenyl sulfone containing up to 4 carbons in the alkyl groups.

2. The polyester of claim 1, wherein the sulfone is N,N'-dimethyl-4,4'-diamino diphenyl sulfone and the bis phenol is p,p'-isopropylidene diphenol.

3. The product of claim 1 which is substantially linear thermoplastic polyester comprising the repeating units

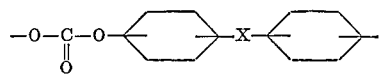

and

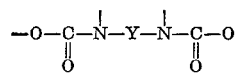

wherein X is the isopropylidene linking radical between a pair of phenyl radicals of the bisphenol and Y is the linking radical between the nitrogens in the N,N'-dialkyl diamino diphenyl sulfone.

References Cited
UNITED STATES PATENTS 3,215,668  11/1965  Bissinger et al. _____ 260—47
3,251,803   5/1966  Caldwell et al. _____ 260—47

SAMUEL H. BLECH, Primary Examiner

U.S. Cl. X.R.

117—132, 230, 232; 161—183; 260—47, 858